US007472559B2

(12) United States Patent
Park et al.

(10) Patent No.: US 7,472,559 B2

(45) Date of Patent: Jan. 6, 2009

(54) METHOD FOR CONTROLLING AIR CONDITIONER

(75) Inventors: Young Min Park, Incheon-si (KR); Dong Jun Yang, Seoul (KR); Yoon Been Lee, Seoul (KR); Il Nahm Hwang, Gyeonggi-do (KR); Seok Ho Yoon, Seoul (KR); Jong Han Park, Gyeonggi-do (KR); Sung Oh Choi, Gyeonggi-do (KR); Sung Chun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 297 days.

(21) Appl. No.: 10/861,999

(22) Filed: Jun. 3, 2004

(65) Prior Publication Data

US 2004/0221593 A1 Nov. 11, 2004

(30) Foreign Application Priority Data

Apr. 4, 2003 (KR) .............................. 2003-21271
Oct. 16, 2003 (KR) ...................... 10-2003-0071990

(51) Int. Cl.
*F25B 1/00* (2006.01)
*F25B 49/00* (2006.01)

(52) U.S. Cl. ........................ 62/230; 62/228.3; 62/228.5

(58) Field of Classification Search .................. 62/230, 62/228.1, 228.3, 228.5, 217, 207
See application file for complete search history.

(56) References Cited

U.S. PATENT DOCUMENTS

| | | | | |
|---|---|---|---|---|
| 1,422,853 | A | | 7/1922 | Hansen |
| 4,798,057 | A | * | 1/1989 | Okamoto et al. ........... 62/228.3 |
| 4,831,836 | A | | 5/1989 | Matsuoka |
| 5,335,507 | A | | 8/1994 | Powell |
| 6,301,911 | B1 | | 10/2001 | Reason et al. |

FOREIGN PATENT DOCUMENTS

| | | | | |
|---|---|---|---|---|
| EP | 0 924 480 | A2 | | 6/1999 |
| GB | 2 287 783 | A | | 9/1995 |
| JP | 04236048 | A | * | 8/1992 |
| JP | 04283361 | | | 10/1992 |
| JP | 06323639 | A | * | 11/1994 |
| JP | 08128740 | | | 5/1996 |
| JP | 08166174 | | | 6/1996 |
| JP | 2000105017 | A | * | 4/2000 |
| JP | 2001153504 | A | * | 6/2001 |

* cited by examiner

*Primary Examiner*—Chen-Wen Jiang
(74) *Attorney, Agent, or Firm*—Lee Hong Degerman Kang & Waimey

(57) ABSTRACT

Disclosed is a method for controlling an air conditioner. In particular, driving modes of elements, namely sucking/discharge compressure, of the compressor in operation are determined so that variable means are controlled to ensure for the elements of the compressor to be within predetermined value ranges in safe area. According to the present invention, vibrations/noises that usually occur when the compressor is in unstable area are greatly reduced and thus, the compressor can be protected from damages.

2 Claims, 18 Drawing Sheets

METHOD FOR CONTROLLING AIR CONDITIONER

CROSS-REFERENCE TO RELATED APPLICATIONS

Pursuant to 35 U.S.C. 119(a), this application claims the benefit of earlier filing date and right of priority to Korean Application No. 10-2003-0071990, filed on Oct. 16, 2003, the contents of which are hereby incorporated by reference herein in their entirety.

BACKGROUND OF THE INVENTION

1. Field of the Invention

The present invention relates in general to operational control of an air conditioner, more particularly, to a method for controlling an air conditioner, in which sucking/discharge compressure of a compressor of an outdoor unit of the air conditioner currently being run are compared to predetermined sucking/discharge compressure to see whether or not the driving mode of the compressor is in a safe or unstable area, and if it turns out that the driving mode of the compressor is unstable variable factors are controlled to make the driving mode of the compressor be in a safe area.

2. Discussion of the Background Art

FIG. 1 is a cross-sectional view of an indoor unit and an outdoor unit of a related art separate-type air conditioner.

As shown in FIG. 1, the separate-type air conditioner includes the outdoor unit 1 installed outside and the indoor unit 2 installed indoors.

The outdoor unit 1 includes a compressor 10 for compressing a refrigerant to a high-temperature/high-pressure state, a condenser 12 for changing the refrigerant from the compressor 10 to a room-temperature/high-pressure state, an outdoor fan 13 for cooling the condenser 12, and a fan motor 5.

The indoor unit 2 includes an EEV (electrical expansion valve) 14*a* for expanding the refrigerant provided from the condenser 12 to a low-pressure state, an evaporator 15 for changing the refrigerant from the EEV 14*a* to a low-temperature/low-pressure state, and a fan 16 for blowing indoor air sucked into the indoor unit 2 at the evaporator 15 for heat change by force.

The location of the EEV 14*a* in the indoor unit 2 of FIG. 1 is only illustrative, that is, the EEV 14*a* can also be installed at the outdoor unit 1.

FIG. 2 is a cross-sectional view of an EEV 14*a* installed at the outdoor unit.

The EEV 14*a* is a device for expanding the room-temperature/high-pressure refrigerant from the condenser 12 (see FIG. 1).

As depicted in FIG. 2, the EEV 14*a* circulates the refrigerant through an inlet pipe 22*a* and an outlet pipe 23*a*.

The refrigerant from the condenser 12 flows in the EEV 14*a* via the inlet pipe 22, 22*a*. When a needle 3 translates in the vertical direction by an operation of a screw 8 induced by a stepping motor 9, an orifice 4 causes the refrigerant to expand to the outlet pipe 23, 23*a* and to be injected.

Therefore, the injection flow of the refrigerant is controlled by the needle 3 and the orifice 4.

FIG. 3 is a cross-sectional view of the outdoor unit 1 including the EEV 14*a*, and FIG. 4 is a cross-sectional view of the indoor unit 2 including the EEV 14*a*.

Referring first to FIG. 3, the room-temperature/high-pressure refrigerant from the condenser 12 flows in the EEV 14*a* through the inlet pipe 22, 22*a* and is expanded and eventually led to the outlet pipe 23, 23*a*.

Referring now to FIG. 4, the room-temperature/high-pressure refrigerant from the condenser 12 of the outdoor unit 1 flows in the EEV 14*a* through the inlet pipe 22, 22*a* and is expanded and eventually led to the outlet pipe 23, 23*a*.

In general, an air conditioner is an apparatus for cooling air within a defined space by discharging cooled air to the inside. To generate the cooled air, a refrigerant undergoes compressing, condensing, expansion, and evaporation. As described before, the air conditioner includes an outdoor unit installed outside and an indoor unit installed indoors. The outdoor unit includes a compressor 10, an accumulator 17, a four-way valve 11, a condenser 12 functioning as an outdoor heat exchanger, and an outdoor fan 13. The indoor unit includes an expansion valve 14, an evaporator 15 functioning as an indoor heat exchanger, and an indoor fan 16.

The air conditioner may include one indoor unit and one outdoor unit. However in some case, a multi-air conditioner in which a plurality of indoor units is connected to one outdoor unit is preferred for cooling or heating many indoor spaces at a time.

FIG. 5 illustrates how the air conditioner with the above construction works. As shown in FIG. 5, low-temperature, low-pressure vaporized refrigerant flows into the compressor 10 from the indoor heat exchanger 15 and turns to high-temperature, high-pressure vaporized refrigerant under the compression of the compressor 10 and at the same time it is discharged to the outdoor heat exchanger 12 through the four-way valve 11 that is switched for a cooling cycle. The discharged refrigerant to the outdoor heat exchanger 12 circulates within the outdoor heat exchanger 12 and when the outdoor fan 13 operates, heat exchange is made between the refrigerant and outdoor air sucked into the outdoor unit. As a result, the high-temperature, high-pressure vaporized refrigerant undergoes a phase change to the room temperature, high-pressure liquid refrigerant.

The liquid refrigerant is then discharged to the expansion valve 14 where the liquid refrigerant is decompressed to a low-temperature, low-pressure liquid state to be evaporated more easily, and the decompressed refrigerant is discharged to the indoor heat exchanger 15, where the refrigerant does heat exchange with the ambient air in the indoor heat exchanger 15 to be low-temperature, low-pressure vaporized refrigerant. This low-temperature, low-pressure vaporized refrigerant flows in the compressor 10 again through the four-way valve 11.

Therefore, the indoor air that was involved in heat exchange with the decompressed refrigerant through the expansion valve 14 in the indoor heat exchanger 15 loses the heat to the refrigerant and turns to cooled air, and this cooled air is discharged into the inside through the indoor fan 16, resulting in the cool comfort of indoor air conditioning.

The heating process of the air conditioner is just opposite to the cooling process thereof. As FIG. 6 illustrates, low-temperature, low pressure vaporized refrigerant from the outdoor heat exchanger 12 is compressed by the compressor 10 and turns to high-temperature, high-pressure vaporized state. This high-temperature, high-pressure vaporized refrigerant is discharged to the indoor heat exchanger 15 through the four-way valve 11 that is switched for a heating cycle. In the indoor heat exchanger 15 is made heat exchange between the discharged vaporized refrigerant and the ambient air of the indoor heat exchanger 15 so that the high-temperature, high-pressure vaporized refrigerant experiences a phase change to room-temperature, high-pressure liquid state and is discharged to the expansion valve 14. Here, the ambient air that was involved in heat exchange with the high-temperature, high-pressure vaporized refrigerant turns to hot air by taking heat out of the refrigerant and at the same time, is discharged to the indoors through the indoor fan 16, resulting in the increase of indoor temperature.

Further, the refrigerant discharged to the expansion valve 14 is decompressed to low-temperature, low-pressure liquid state and discharged to the outdoor heat exchanger 12 for evaporation. In the outdoor heat exchanger 12 is heat exchange made between the refrigerant discharged to the outdoor heat exchanger 12 and outdoor air flown in the outdoor unit. After heat exchange, the low-temperature, low-pressure liquid refrigerant turns to low-temperature, low-pressure vaporized state and flows in the compressor 10 again through the four-way valve 11.

The above-described cooling and heating processes are possible by controlling desired pressure and temperature.

In other words, the related art air conditioner runs in accordance with a control system of sucking/discharge compressure of the compressor 10 or a predetermined driving step of the compressor 10 obtained by calculating indoor/outdoor temperatures and the capacity of the indoor unit to be operated. When the air conditioner runs on the basis of the compressure and temperature values, at least one of the sucking compressure and discharge compressure of the compressure 10 in operation is lowered. In such case, the compressor 10 departs from a safe area where vibrations/noises of the compressor 10 are low and the compressor 10 does not overrun, and enters to an unstable area as shown in FIG. 7, in which vibrations/noises of the compressor 10 are great.

When the compressor 10 runs in the unstable area for an extended period of time, the compressor 10 is easily damaged by the increase of vibrations/noises and needs to be replaced soon. Mechanical damages on the compressor 10 consequently deteriorate performance and capacity of the air conditioner.

Moreover, if the compressor 10 is damaged primarily because of the increased vibrations/noises, it brings a serious problem to the reliability and durability of the compressor itself.

SUMMARY OF THE INVENTION

An object of the invention is to solve at least the above problems and/or disadvantages and to provide at least the advantages described hereinafter.

Accordingly, one object of the present invention is to solve the foregoing problems by providing a method for controlling an air conditioner, in which sucking/discharge compressure of a compressor of an outdoor unit currently being run are compared to predetermined optimum sucking/discharge compressure for the compressor to see whether or not the driving mode of the compressor is in a safe or unstable area, and if it turns out that the driving mode of the compressor is in the unstable area, variable factors, compressor operational frequency, indoor/outdoor EEV and indoor/outdoor fan for example, are controlled to make the driving mode of the compressor be in a safe region, whereby vibrations/noises generated by the operation in the unstable area are suppressed and the compressor is protected from damages and reliability and durability of the compressor are enhanced.

The foregoing and other objects and advantages are realized by providing a method for controlling an air conditioner including at least one indoor unit with a compressor and at least one outdoor unit with a condenser, in which the method includes the steps of: predetermining at least one operational value including compressure/temperature value of the compressor to be in a safe area; measuring operational values of the compressor currently being run; comparing the operational value measurements to the predetermined operational values in the safe area; if a current driving mode of the compressor does not satisfy the safe area, controlling variable means to ensure that the compressor runs in the safe area.

According to the present invention, vibrations/noises that usually occur when the compressor is in unstable area are greatly reduced and thus, the compressor can be protected from damages.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present a method for controlling an air conditioner according to a preferred embodiment of the invention in reference to the accompanying drawings.

Figure 1:
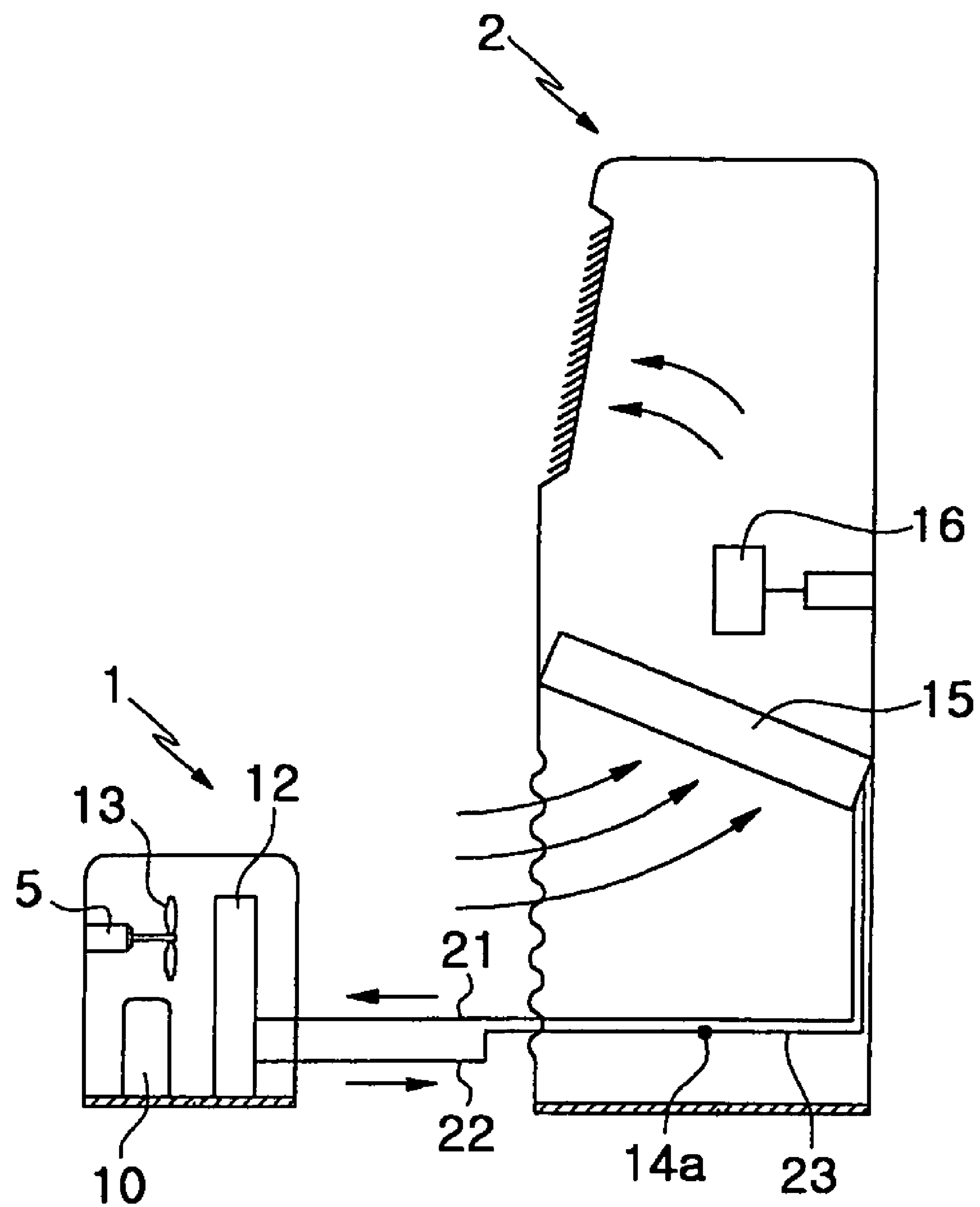
FIG. 1 is a cross-sectional view of an indoor unit and an outdoor unit of a related art separate-type air conditioner.
Figure 2:
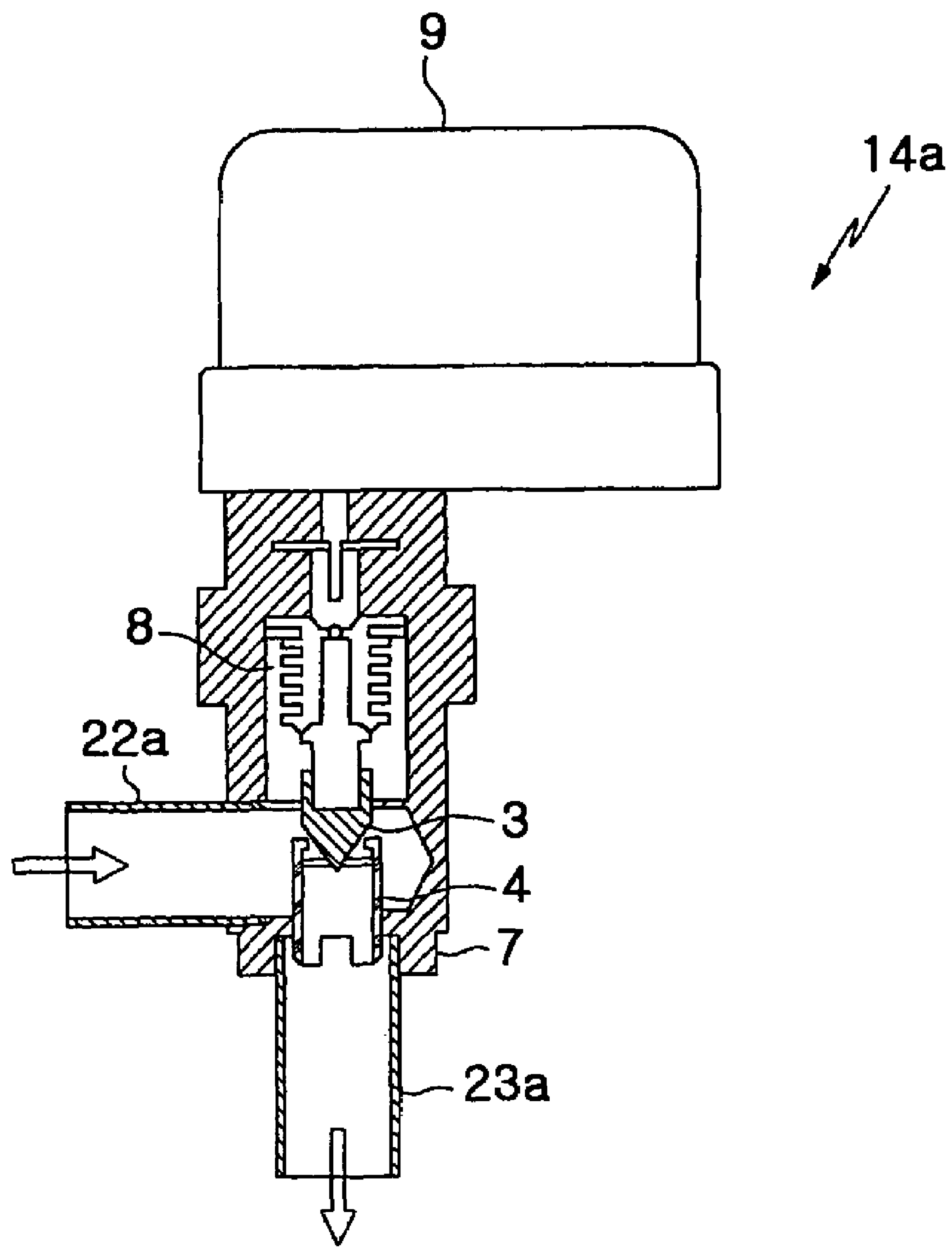
FIG. 2 is a cross-sectional view of an EEV installed at an outdoor unit or indoor unit of a related art air conditioner.
Figure 3:
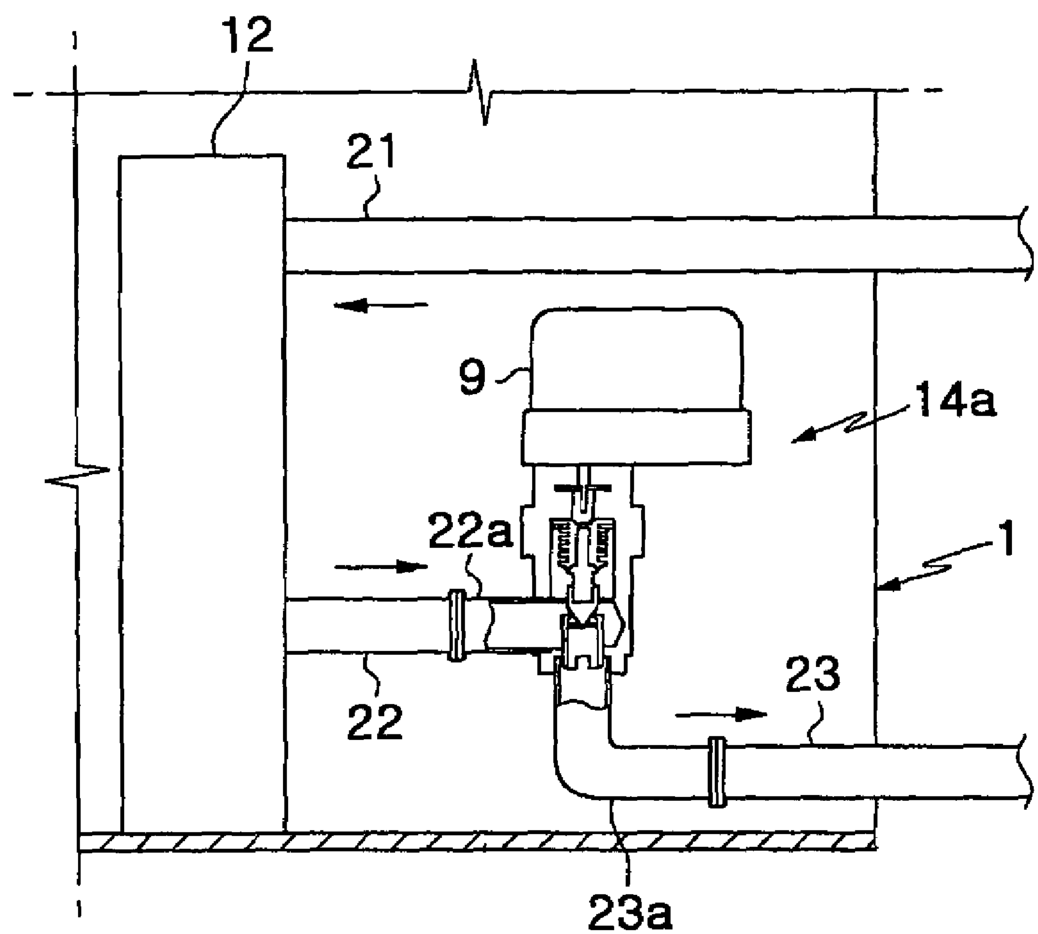
FIG. 3 is a cross-sectional view of an EEV installed at an outdoor unit of a related art separate-type air conditioner.
Figure 4:
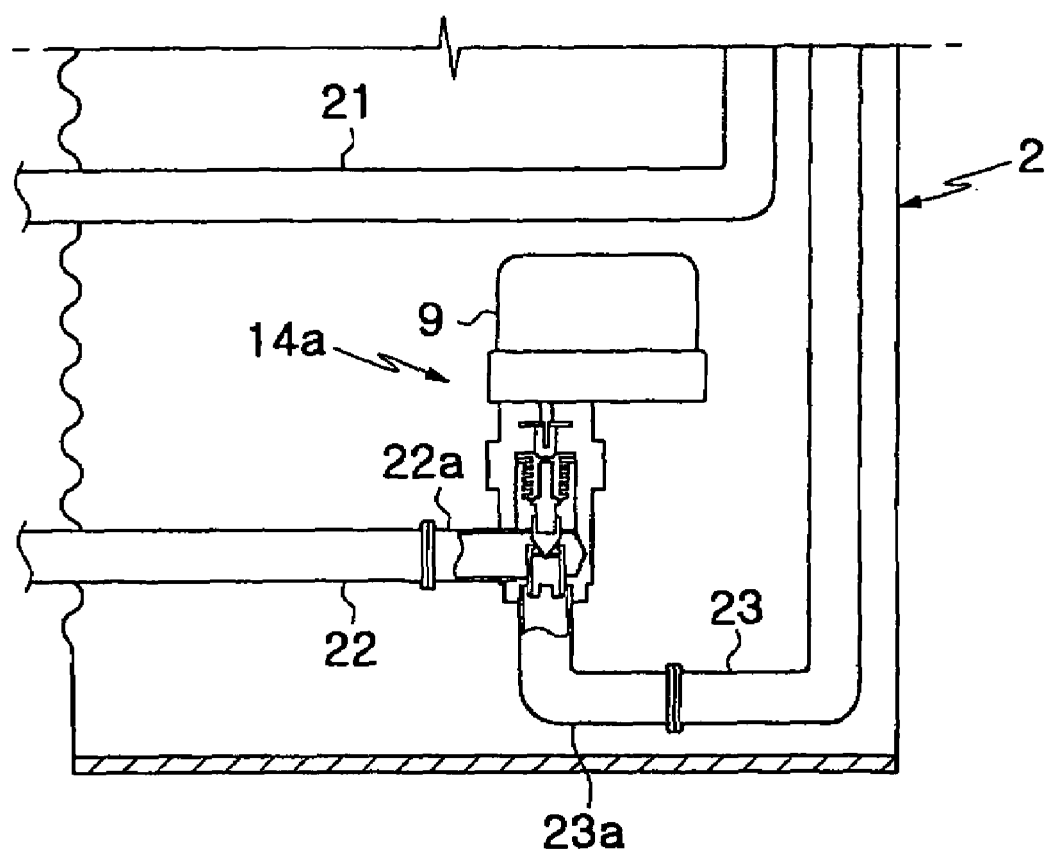
FIG. 4 is a cross-sectional view of an EEV installed at an indoor unit of a related art separate-type air conditioner.
Figure 5:
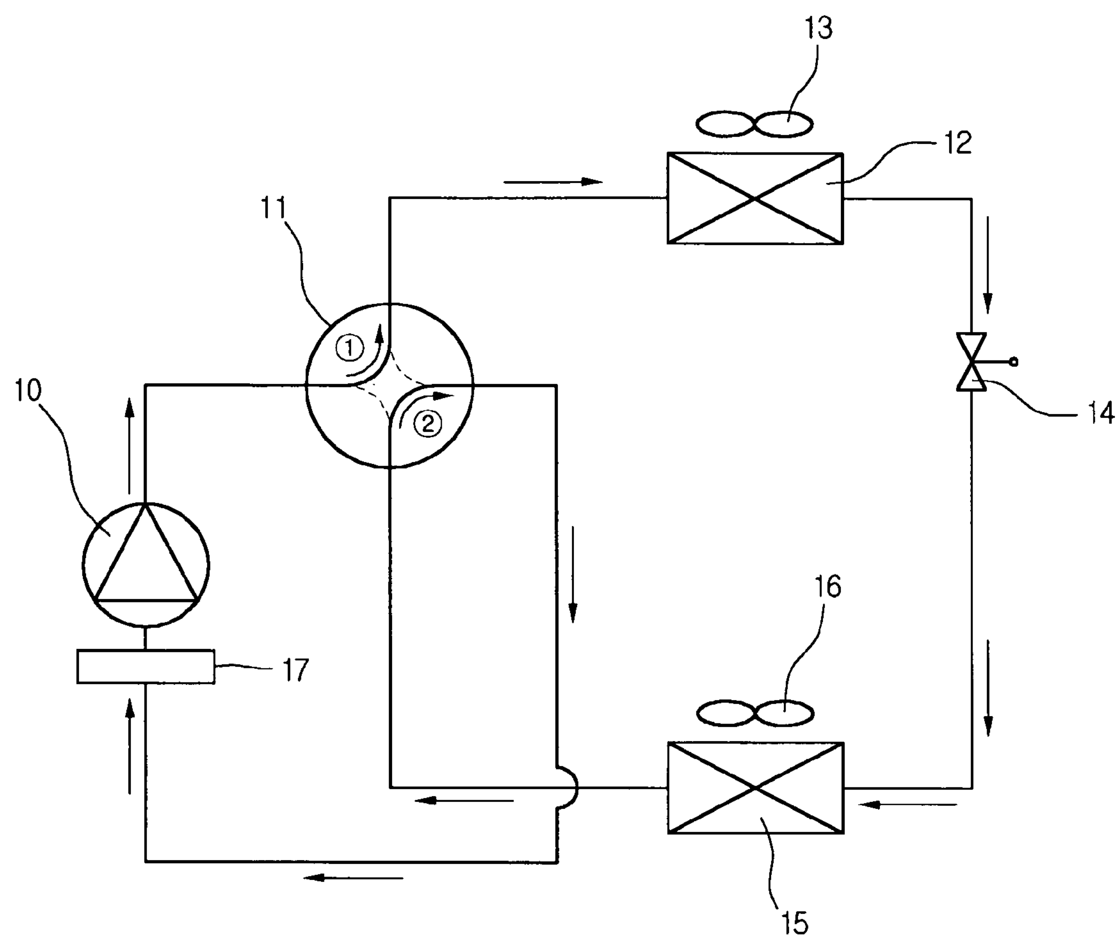
FIG. 5 illustrates a cooling cycle of a related art air conditioner.
Figure 6:
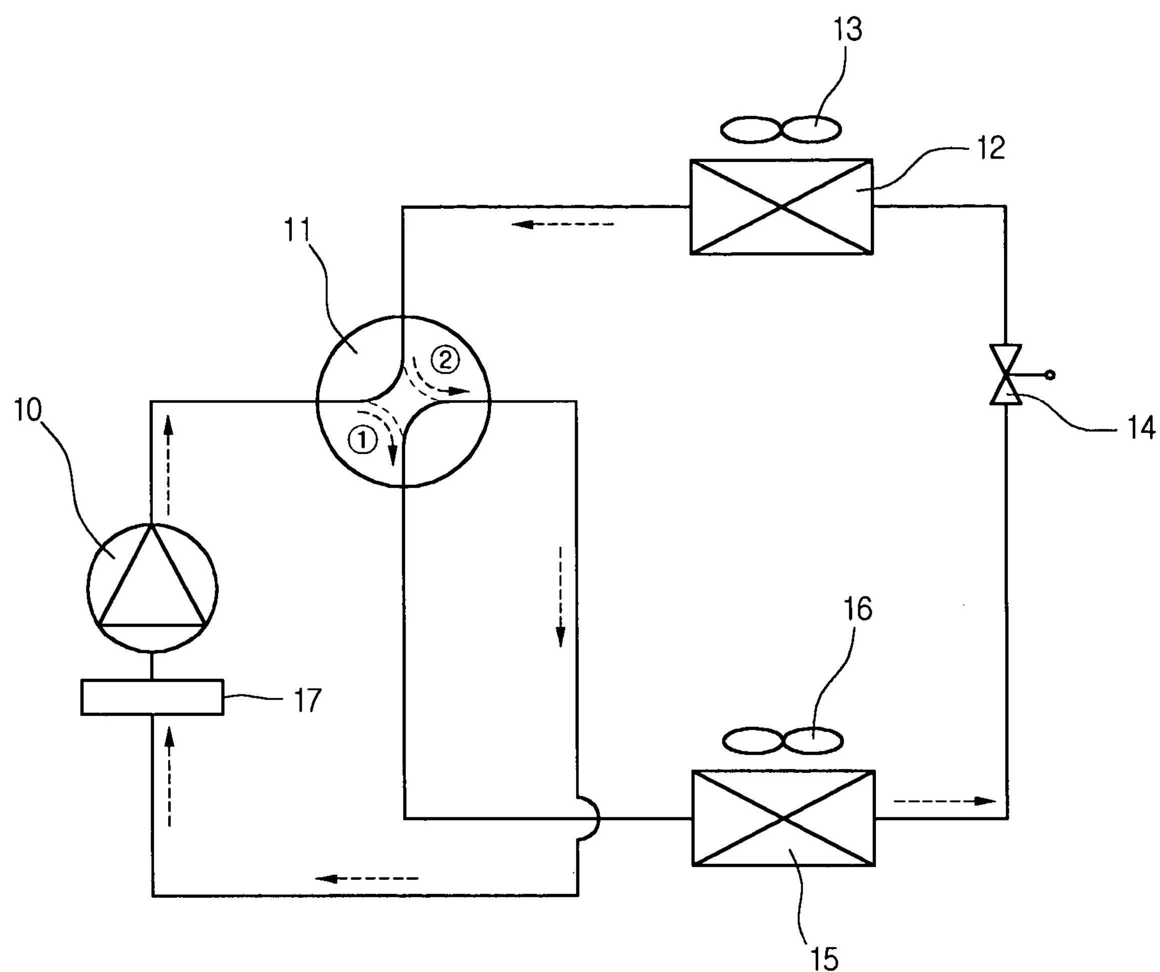
FIG. 6 illustrates a heating cycle of a related art air conditioner.
Figure 7:
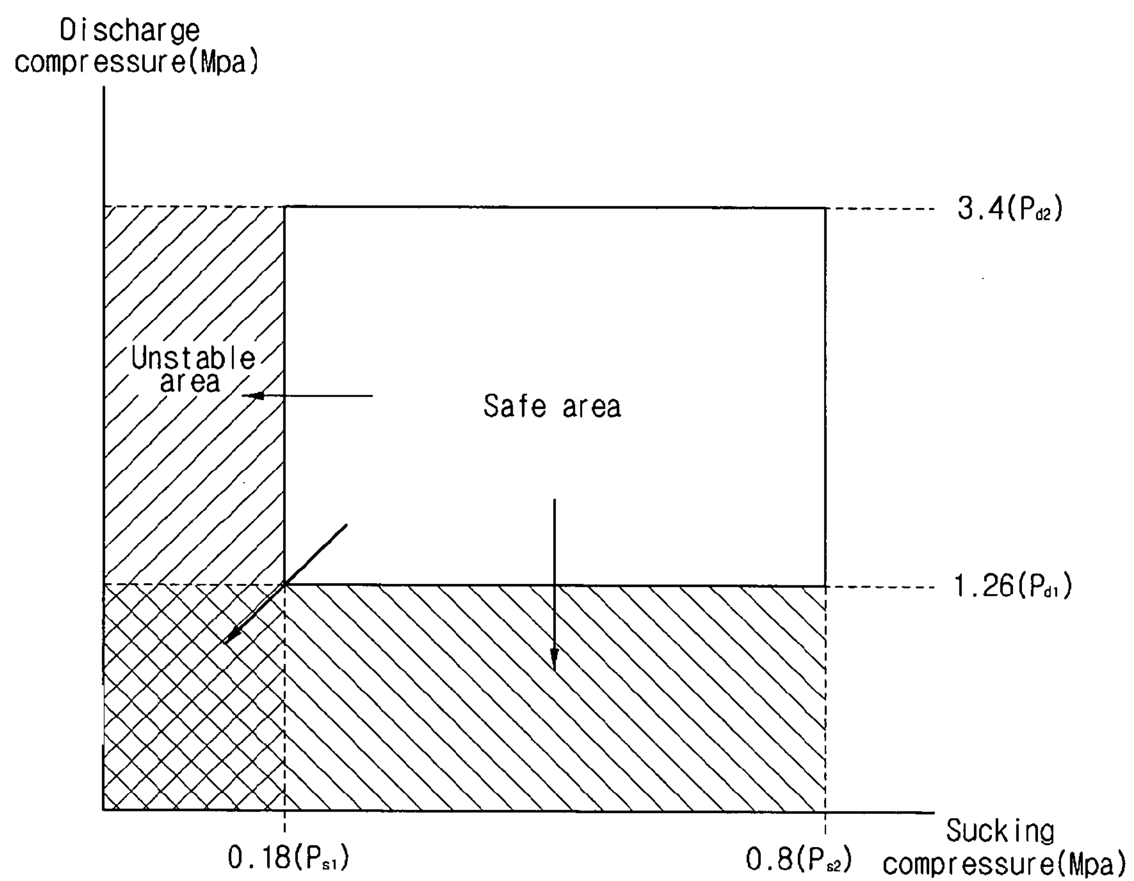
FIG. 7 is a graph illustrating a driving mode of a compressor in an unstable area wherein sucking/discharge compressure of the compressor in operation are out of predetermined sucking/discharge compressure ranges.
Figure 8:
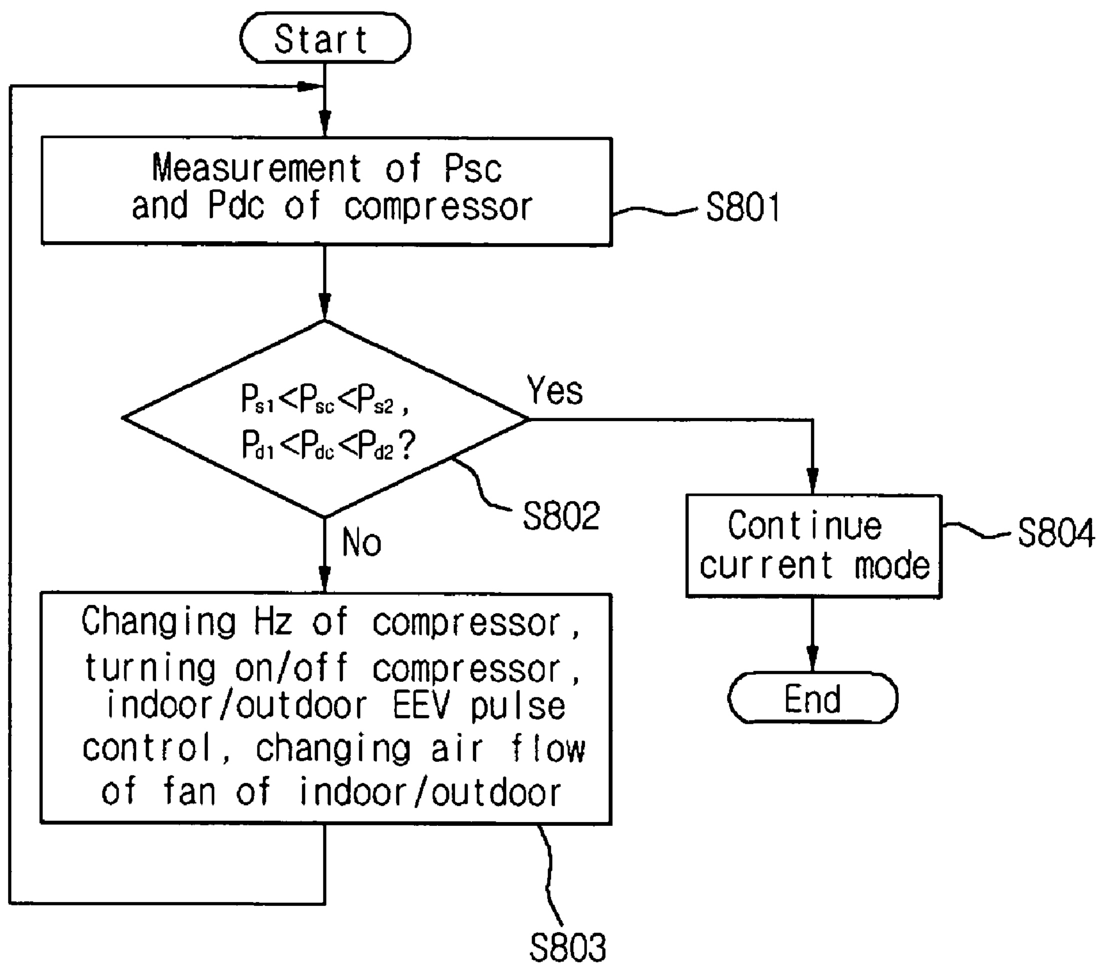
FIG. 8 is a flow chart describing a procedure for changing an unstable driving area of a compressor to a safe driving mode within predetermined sucking/discharge compressure range, in accordance with the present invention.

FIG. 8 is a flow chart describing a procedure for changing an unstable driving mode of a compressor to a safe driving mode within predetermined sucking/discharge compressure range, in accordance with the present invention.

More details on the method for controlling an air conditioner are now provided below. Like numerical referrals are applied to like elements of the present invention and related art.

As shown in FIG. 8, the method for controlling an air conditioner includes the steps of: measuring sucking/discharge compressure (Psc/Pdc) of the compressor 10 for cooling/heating (S801); comparing the measured sucking/discharge compressure of the compressor 10 to the predetermined sucking/discharge compressure; determining whether or not the sucking/discharge compressure (Psc/Pdc) measurements of the compressor 10 falls in first, second predetermined sucking/discharge compressure ranges (Ps1, Ps2/Pd1, Pd2) (S802); and if the sucking/discharge compressure (Psc/Pdc) measurements are out of the first, second predetermined sucking/discharge compressure ranges (Ps1, Ps2/Pd1, Pd2), controlling variable means to make the sucking/discharge compressure (Psc/Pdc) measurements fall in the predetermined sucking/discharge compressure ranges (Ps1, Ps2/Pd1, Pd2) (S803).

After controlling the variable means, it is determined once more whether or not the sucking/discharge compressure (Psc/Pdc) of the compressor 10 are within the predetermined sucking/discharge compressure ranges (Ps1, Ps2/Pd1, Pd2).

Therefore, the method for controlling the air conditioner of the present invention is basically to control variable elements of the air conditioner to ensure that the air conditioner that usually works based on compressure and/or temperature values being set gives its full capacity of target cooling/heating processes.

That is to say, even though the compressor 10 works according to the predetermined driving step which is obtained based on calculations of indoor/outdoor temperatures and the capacity of the indoor unit to be run, it is possible to help the compressor 10 run in the safe area all the time either by controlling the sucking/discharge compressure (Psc, Pdc) of the compressor 10 or by controlling at least one of variable means including the operational frequency of the compressor 10, indoor/outdoor EEVs 14*a* and the outdoor fan 13 to change the driving mode of the compressor 10 in the unstable area, where the sucking compressure (Psc) and/or the discharge compressure (Pdc) is lowered, into the safe area.

Controlling variable means for the air conditioner in the cooling/heating mode involves at least one of controlling the operational frequency (Hz) of the compressor 10, turning on/off the compressor 10, adjusting indoor/outdoor EEV 14*a* pulse, and changing air flow of the indoor/outdoor fans.

By controlling the variable means, the compressor 10 in the unstable area, in which the driving mode of the compressor 10 is out of the predetermined sucking/discharge compressure ranges (Ps1, Ps2/Pd1, Pd2) and thus the sucking/discharge compressure (Psc/Pdc) are increased, the compressor 10 enters the safe area within the first, second predetermined sucking/discharge compressure ranges (Ps1, Ps2/Pd1, Pd2). As a result, the reliability of the compressor 10 is secured.

The safe area for the compressor 10 is where vibrations and noises are low and the reliability of driving is secured. The compressor made in Daikin Industries Ltd. of Japan, for example, has the sucking compressure (Ps1, Ps2) in the range of 0.18-0.8 MPa and the discharge compressure (Pd1, Pd2) in the range of 1.26-3.4 MPa. Although other compressors except for the compressors made in Daikin Industries Ltd. have different ranges for the safe area, they too can be changed to the safe area from the unstable area through the method for controlling the air conditioner of the present invention.

In the preferred embodiment of the invention, 0.18 MPa is designated as the first sucking compressure (Ps1) and 0.8 MPa is designated as the second sucking compressure (Ps2). Also, 1.26 MPa is designated as the first discharge compressure (Pd1) and 3.4 MPa is designated as the second discharge compressure (Pd2).

As described in the flow chart of FIG. 8, to control the air conditioner, the sucking/discharge compressure (Psc/Pdc) of the compressor 10 in the cooling/heating mode are measured (S801).

The sucking/discharge compressure (Psc/Pdc) measurements of the compressor 10 are compared to the predetermined sucking/discharge compressure and it is determined whether the sucking/discharge compressure (Psc/Pdc) measurements fall in the range of the first and second predetermined sucking compressure (Ps1, Ps2), i.e. 0.18-0.8 MPa and of the first and second predetermined discharge compressure (Pd1, Pd2), i.e. 1.26-3.4 MPa, respectively (S802).

If it turns out that the sucking/discharge compressure (Psc/Pdc) measurements are within the first and second sucking compressure ranges (Ps1, Ps2/Pd1, Pd2), the compressor 10 is allowed to keep running as it has been (S804). On the contrary, if at least one of the sucking/discharge compressure (Psc/Pdc) measurements is out of the first and second predetermined sucking/discharge compressure ranges (Ps1, Ps2/Pd1, Pd2), the operational frequency (Hz) of the compressor 10 in the safe area (cooling/heating) of the air conditioner is changed or the compressor 10 is turned on/off or the pulse of the indoor/outdoor EEV is adjusted and/or the air flow of the indoor/outdoor fan is varied (S803), in order to make the sucking/discharge compressure (Psc/Pdc) measurements fall in the predetermined sucking/discharge compressure ranges (Ps1, Ps2/Pd1, Pd2).

After controlling the variable means, it is determined again whether or not the sucking/discharge compressure (Psc/Pdc) of the compressor 10 are within the predetermined sucking/discharge compressure ranges (Ps1, Ps2/Pd1, Pd2). If the sucking/discharge compressure (Psc/Pdc) of the compressor 10 are within the predetermined sucking/discharge compressure ranges (Ps1, Ps2/Pd1, Pd2), the compressor 10 is allowed to operate in the current driving mode. If the sucking/discharge compressure (Psc/Pdc) of the compressor 10 are out of the predetermined sucking/discharge compressure ranges (Ps1, Ps2/Pd1, Pd2), however, the above-described procedure is repeated until the sucking/discharge compressure (Psc/Pdc) of the compressor 10 are within the predetermined sucking/discharge compressure ranges (Ps1, Ps2/Pd1, Pd2).

In some cases, only the discharge compressure (Pdc) of the compressor 10 falls within the predetermined discharge compressure range (Pd1, Pd2) while the sucking compressure (Psc) is out of the lowest limit (Ps1) of the predetermined sucking compressure. In another case, only the discharge compressure (Pdc) of the compressor 10 is out of the lowest limit (Pd1) of the predetermined discharge compressure. Still in another case, both sucking/discharge compressure (Psc, Pdc) are out of the lowest limits (Ps1, Pd1) of the predetermined sucking/discharge compressure ranges. Each case will now be discussed, indicated by the first, second, and third embodiments for controlling the air conditioner.

Figure 9:
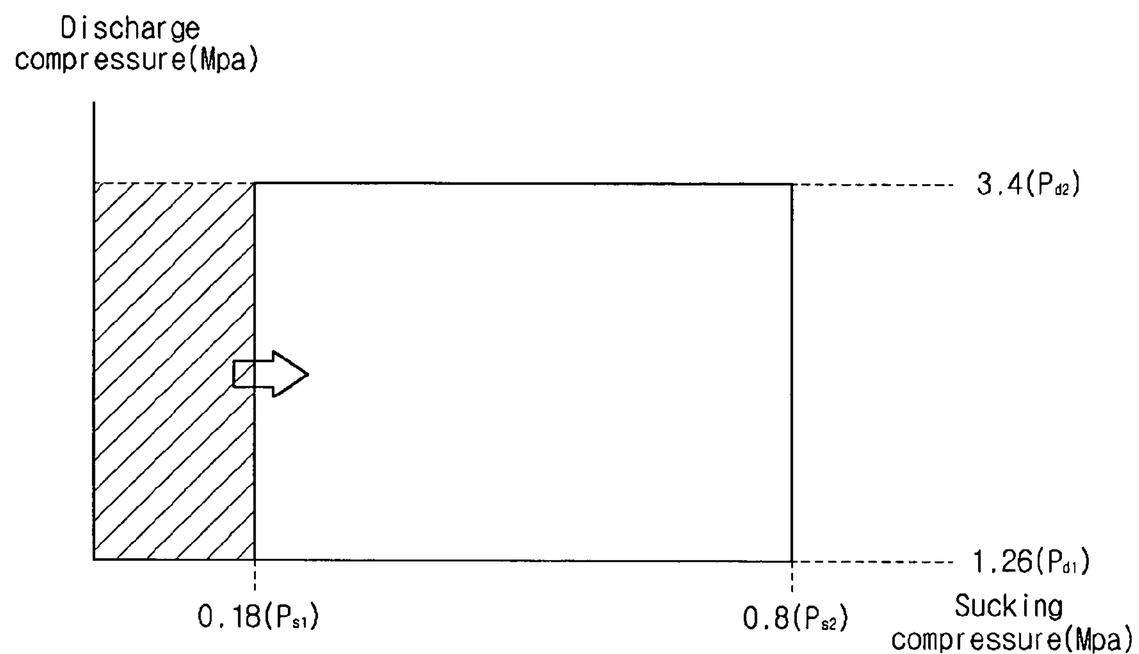
FIG. 9 graphically illustrates a driving mode of a compressor in an unstable area, in which a sucking compressure of the compressor in operation is out of the lowest limit of a predetermined sucking compressure.
Figure 10:
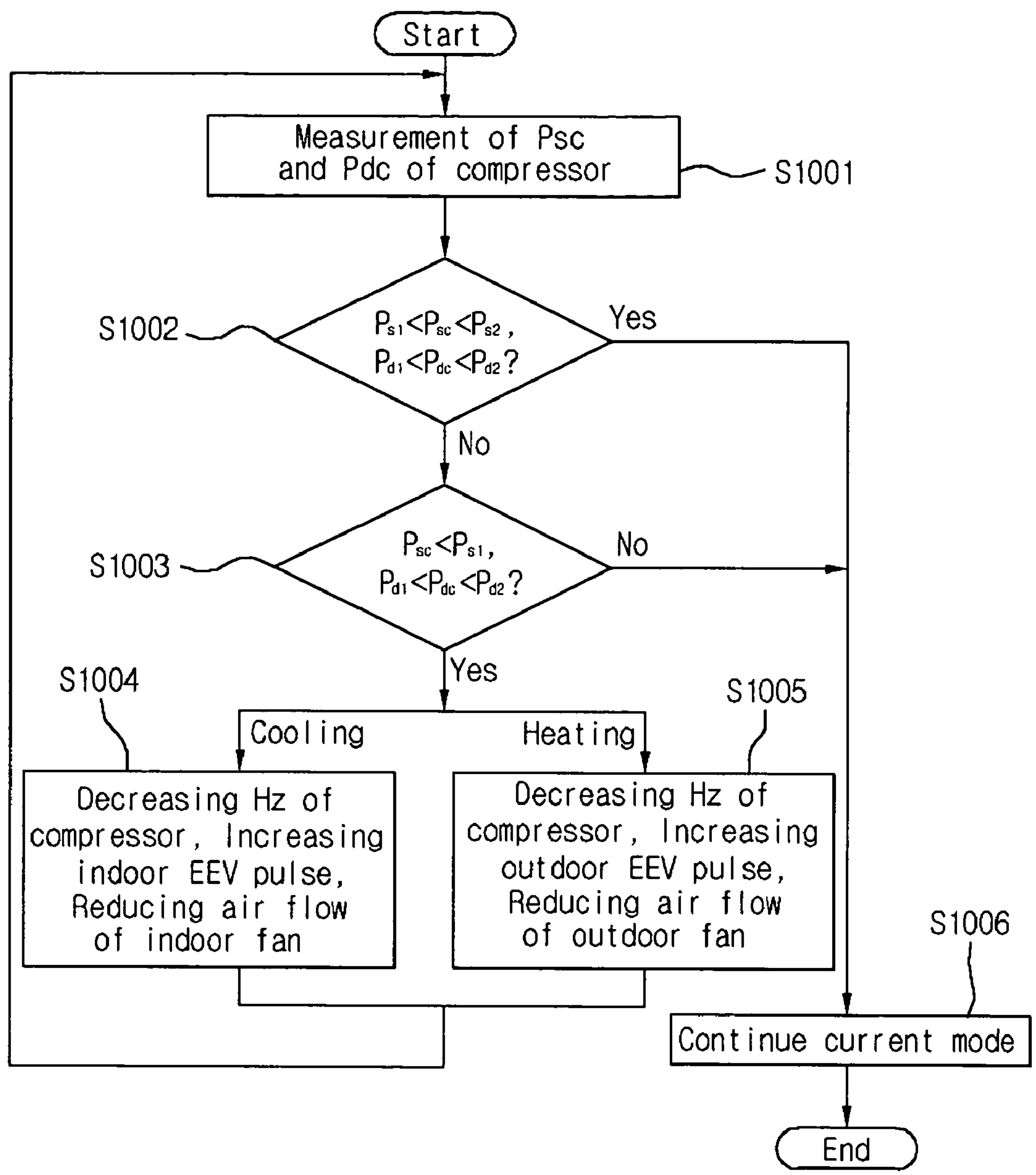
FIG. 10 is a flow chart describing a procedure for changing an unstable driving mode of a compressor being out of the lowest limit of a predetermined sucking compressure to a safe driving mode within first, second predetermined sucking compressure ranges, in accordance with a first preferred embodiment of the present invention.

FIG. 9 graphically illustrates a driving mode of the compressor in the unstable area, in which the sucking compressure of the compressor in operation is out of the lowest limit of the predetermined sucking compressure; and FIG. 10 is a flow chart describing a procedure for changing the unstable driving mode of the compressor being out of the lowest limit of the predetermined sucking compressure to the safe driving mode within the first, second predetermined sucking compressure ranges, in accordance with the first preferred embodiment of the present invention.

As described in FIG. 10, the unstable driving mode of the compressor 10 being out of the lowest limit (Ps1) of the predetermined sucking compressure is changed to the safe driving mode within the first, second predetermined sucking compressure ranges (Ps1, Ps2) according to the method for controlling the air conditioner of the invention.

At first, the sucking/discharge compressure (Psc, Pdc) of the compressor in the cooling/heating mode are measured, and the sucking/discharge compressure measurements (Psc, Pdc) are compared to the predetermined sucking/discharge compressure in order to find out whether the sucking/discharge compressure measurements (Psc, Pdc) are within the first, second predetermined sucking/discharge compressure ranges (Ps1, Ps2/Pd1, Pd2).

If it turns out that the discharge compressure (Pdc) of the compressor is within the predetermined discharge compressure range (Pd1, Pd2) but the sucking compressure (Psc) is out of the lowest limit (Ps1) of the predetermined sucking compressure, the variable means are controlled to make the sucking compressure (Psc) fall within the predetermined sucking compressure range (Ps1, Ps2).

After controlling the variable means, it is determined one more time whether or not the sucking/discharge compressure (Psc/Pdc) of the compressor 10 are within the predetermined sucking/discharge compressure ranges (Ps1, Ps2/Pd1, Pd2).

Controlling variable means of the air conditioner in the cooling/heating mode involves at least one of reducing the operational frequency (Hz) of the compressor 10, increasing indoor EEV pulse in the cooling mode, increasing outdoor EEV pulse in the heating mode, reducing air flow of the indoor fan 16 in the cooling mode, and reducing air flow of the outdoor fan 13 in the heating mode.

By controlling the variable means, the sucking compressure (Psc) of the compressor 10 having been out of the lowest (first) limit (Ps1) of the predetermined sucking compressure enters the same area within the first, second predetermined sucking compressure ranges (Ps1, Ps2). As a result, the reliability of the compressor 10 is secured.

The above-described method will now be elaborated with reference to the flow chart in FIG. 10.

As shown in FIG. 10, the sucking/discharge compressure (Psc/Pdc) of the compressor 10 of the air conditioner in the cooling/heating mode are measured (S1001).

The sucking/discharge compressure (Psc/Pdc) measurements of the compressor 10 are compared to the predetermined sucking/discharge compressure and it is determined whether the sucking/discharge compressure (Psc/Pdc) measurements fall in the range of the first and second predetermined sucking compressure (Ps1, Ps2), i.e. 0.18-0.8 MPa and of the first and second predetermined discharge compressure (Pd1, Pd2), i.e. 1.26-3.4 MPa, respectively (S1002).

If it turns out that the sucking/discharge compressure (Psc/Pdc) measurements are within the first and second sucking compressure ranges (Ps1, Ps2/Pd1, Pd2), namely 0.18-0.8 MPa/1.26-3.4 MPa, the compressor 10 is allowed to keep its current driving mode (S1006).

On the other hand, if only the discharge compressure (Pdc) of the compressor 10 is in the range of the first, second predetermined discharge compressure ranges (Pd1, Pd2), i.e. 1.26-3.4 MPa while the sucking compressure (Psc) of the compressor 10 is less than the lowest limit (Ps1), i.e. 0.18 MPa, of the predetermined sucking compressure (S1003), it is necessary to make the sucking compressure (Psc) of the compressor 10 falls in the predetermined sucking compressure range (Ps1, Ps2). To do so, the operational frequency (Hz) of the compressor 10 (if it is in the cooling mode) is reduced or the indoor EEV pulse is increased or air flow of the indoor fan is reduced (S1004), and if the compressor 10 is in the heating mode, the operational frequency (Hz) of the compressor 10 is reduced or the outdoor EEV pulse is increased or air flow of the outdoor fan 13 is reduced (S1005).

After controlling the variable means, it is determined again whether or not the sucking compressure (Psc) of the compressor 10 is within the predetermined sucking/discharge compressure ranges (Ps1, Ps2/Pd1, Pd2). If the sucking compressure (Psc) of the compressor 10 is within the predetermined sucking/discharge compressure ranges (Ps1, Ps2/Pd1, Pd2), namely in the range of 0.18-0.8 MPa for the sucking compressure and 1.26-3.4 MPa for the discharge compressure, the compressor 10 is allowed to operate in the current driving mode (S1006). If the sucking compressure (Psc) of the compressor 10 is below the lowest limit (Ps1) of the predetermined sucking compressure range, however, the above-described procedure is repeated until the sucking compressure (Psc) of the compressor 10 are within the predetermined sucking compressure range (Ps1, Ps2).

Figure 11:
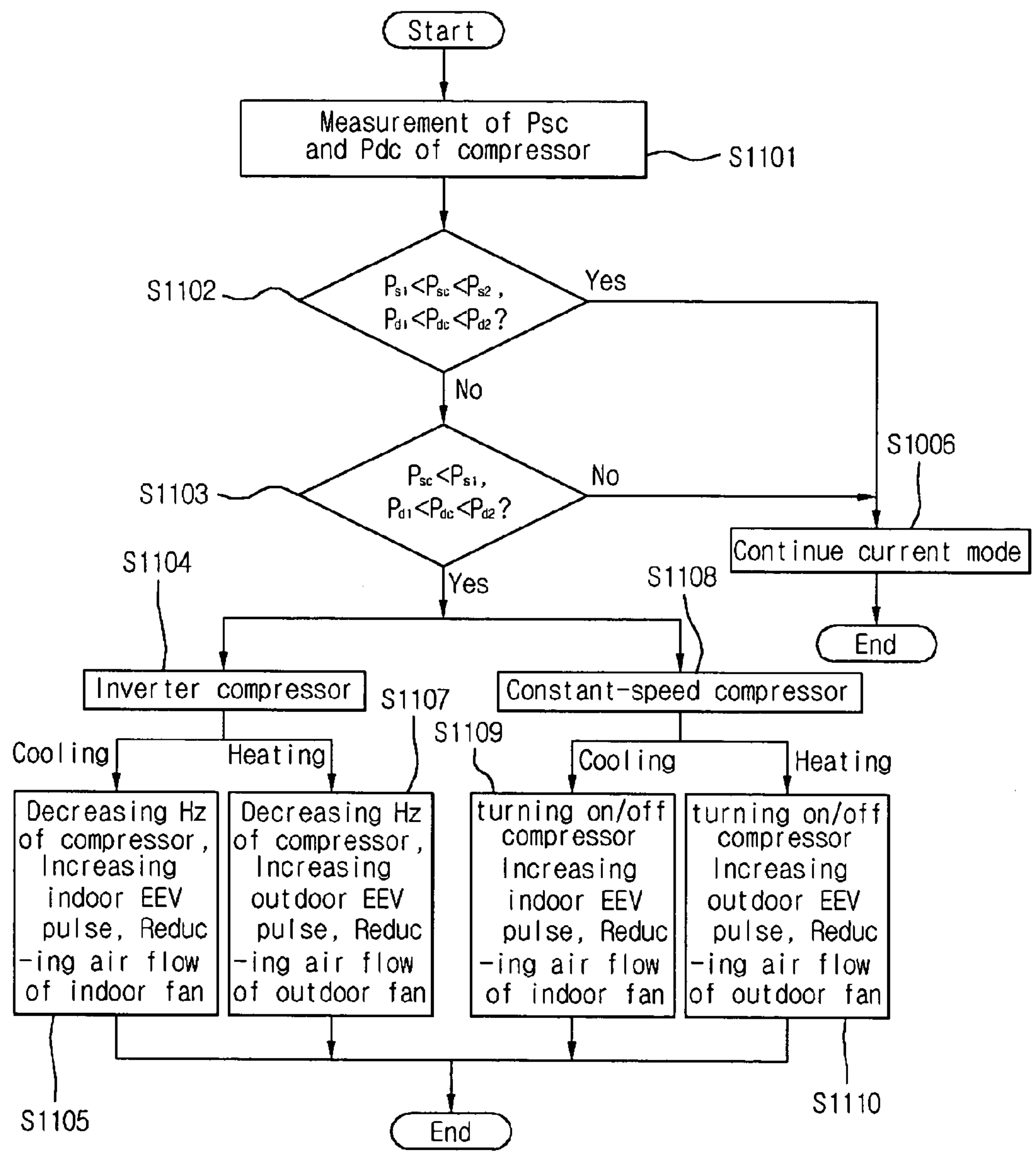
FIG. 11 illustrates the procedure of FIG. 10 being conducted at an inverter compressor and a constant-speed compressor.

FIG. 11 illustrates the procedure of FIG. 10 being conducted at an inverter compressor and a constant-speed compressor.

Since basic operations are same as described in FIG. 10, no further details will be provided here.

Figure 12:
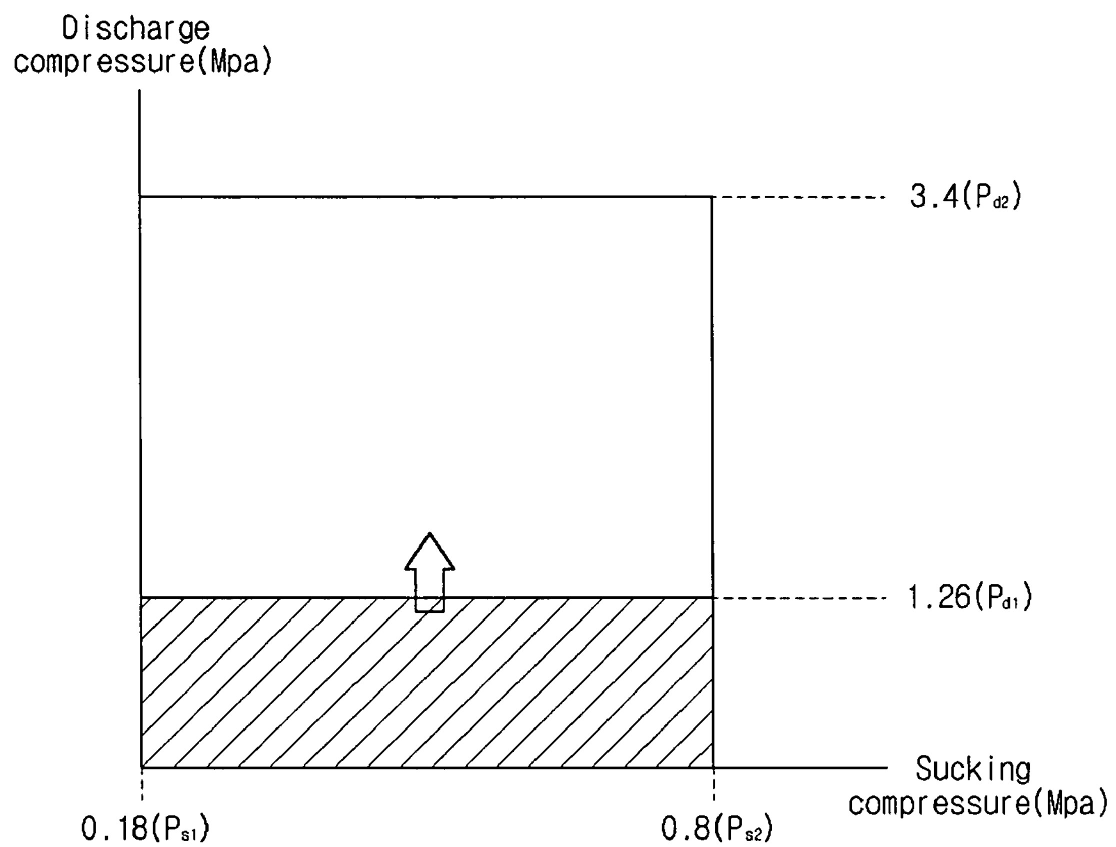
FIG. 12 graphically illustrates a driving mode of a compressor in an unstable area, in which a discharge compressure of the compressor in operation is out of the lowest limit of a predetermined discharge compressure.
Figure 13:
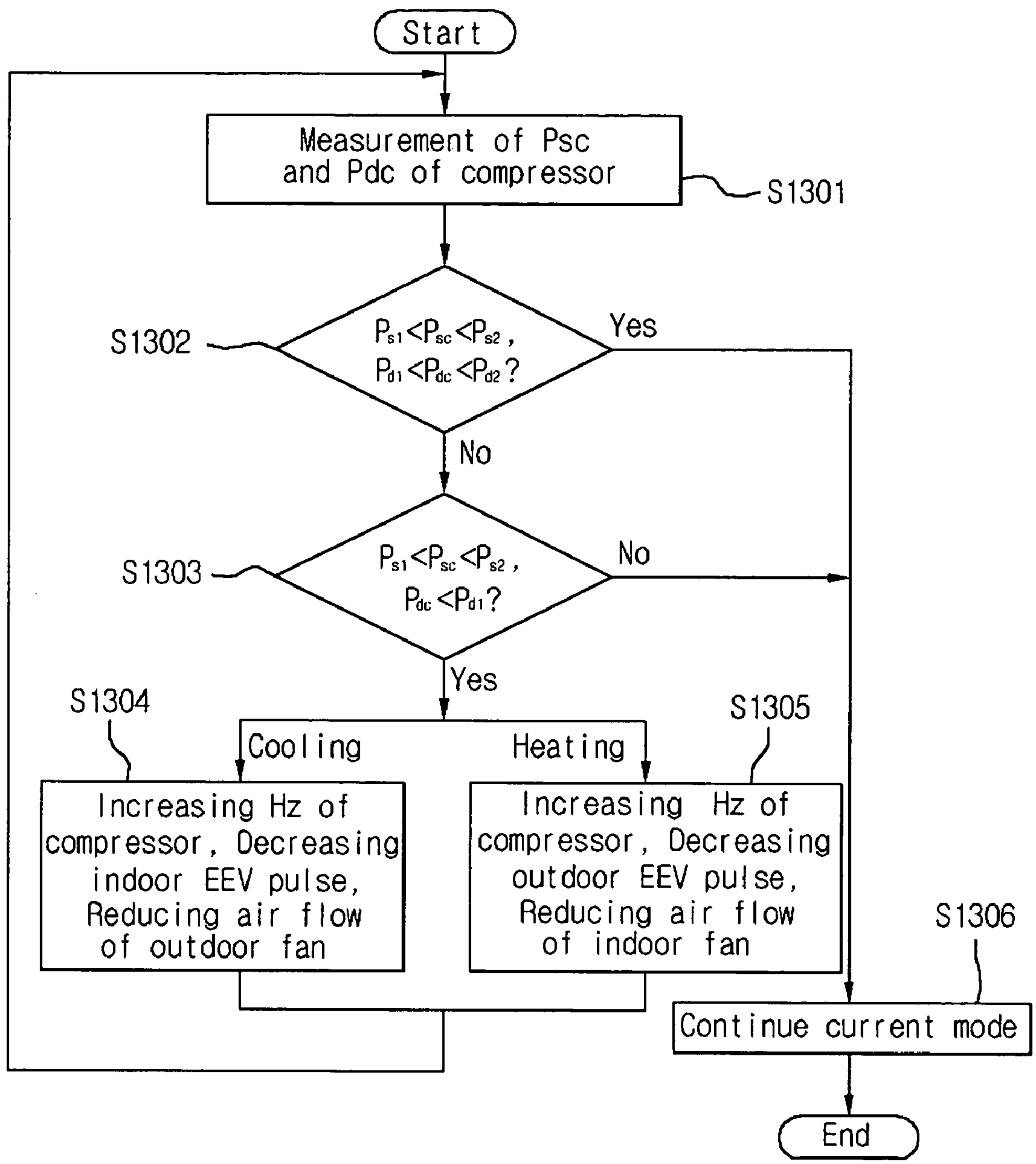
FIG. 13 is a flow chart describing a procedure for changing an unstable driving mode of a compressor being out of the lowest limit of a predetermined discharge compressure to a safe driving mode within first, second predetermined discharge compressure range, in accordance with a second preferred embodiment of the present invention.

Only difference is that in case of the inverter compressor, the operational frequency in the cooling/heating mode is controlled and in case of the constant-speed compressor, the compressor is turned on/off FIG. 12 graphically illustrates a driving mode of the compressor in the unstable area, in which the discharge compressure of the compressor in operation is out of the lowest limit of the predetermined discharge compressure; and FIG. 13 is a flow chart describing a procedure for changing the unstable driving mode of the compressor being out of the lowest limit of the predetermined discharge compressure to the safe driving mode within first, second predetermined discharge compressure ranges, in accordance with the second preferred embodiment of the present invention.

In the second embodiment of the invention, the unstable driving mode of the compressor 10 being out of the lowest limit (Pd1) of the predetermined discharge compressure is changed to the safe driving mode within first, second predetermined discharge compressure range (Pd1, Pd2).

As described in FIG. 13, the sucking/discharge compressure (Psc, Pdc) of the compressor 10 in the cooling/heating mode are measured and compared to the predetermined sucking/discharge compressure of the compressor 10, in order to find out whether the sucking/discharge compressure measurements (Psc, Pdc) are within the first, second predetermined sucking/discharge compressure ranges (Ps1, Ps2/Pd1, Pd2).

If it turns out that the sucking compressure (Psc) of the compressor is within the predetermined discharge compressure range (Ps1, Ps2) but the discharge compressure (Pdc) is out of the lowest limit (Pd1) of the predetermined discharge compressure, the variable means are controlled to make the discharge compressure (Pdc) fall within the predetermined discharge compressure range (Pd1, Pd2).

After controlling the variable means, it is determined one more time whether or not the sucking/discharge compressure (Psc/Pdc) of the compressor 10 are within the predetermined sucking/discharge compressure ranges (Ps1, Ps2/Pd1, Pd2).

Controlling variable means of the air conditioner in the cooling/heating mode involves at least one of increasing the operational frequency (Hz) of the compressor 10 of the air conditioner in the cooling/heating mode, decreasing indoor EEV pulse in the heating mode, decreasing outdoor EEV pulse in the cooling mode, reducing air flow of the outdoor fan 13 in the cooling mode, and reducing air flow of the indoor fan 16 in the heating mode.

By controlling the variable means, the discharge compressure (Pdc) of the compressor 10 having been out of the lowest (first) limit (Pd1) of the predetermined discharge compressure goes back to the same area within the first, second predetermined discharge compressure ranges (Pd1, Pd2). As a result, the reliability of the compressor 10 is secured.

The above-described method will now be elaborated with reference to the flow chart in FIG. 13.

As shown in FIG. 13, the sucking/discharge compressure (Psc/Pdc) of the compressor 10 of the air conditioner in the cooling/heating mode are measured (S1301).

The sucking/discharge compressure (Psc/Pdc) measurements of the compressor 10 are compared to the predetermined sucking/discharge compressure and it is determined whether the sucking/discharge compressure (Psc/Pdc) measurements fall in the range of the first and second predetermined sucking compressure (Ps1, Ps2), i.e. 0.18-0.8 MPa and of the first and second predetermined discharge compressure (Pd1, Pd2), i.e. 1.26-3.4 MPa, respectively (S1302).

If it turns out that the sucking/discharge compressure (Psc/Pdc) measurements are within the first and second sucking compressure ranges (Ps1, Ps2/Pd1, Pd2), namely 0.18-0.8 MPa/1.26-3.4 MPa, the compressor 10 is allowed to keep its current driving mode (S1306).

On the contrary, if only the sucking compressure (Psc) of the compressor 10 is in the range of the first, second predetermined discharge compressure ranges (Ps1, Ps2), i.e. 0.18-0.8 MPa while the discharge compressure (Pdc) of the compressor 10 is less than the lowest limit (Pd1), i.e. 1.26 MPa, of the predetermined discharge compressure (S1303), it is necessary to make the discharge compressure (Pdc) of the compressor 10 falls in the predetermined discharge compressure range (Pd1, Pd2). To do so, the operational frequency (Hz) of the compressor 10 (if it is in the cooling mode) is increased or the indoor EEV pulse is decreased or air flow of the outdoor fan 13 is reduced (S1304), and if the compressor 10 is in the heating mode, the operational frequency (Hz) of the compressor 10 is increased or the outdoor EEV pulse is decreased or air flow of the indoor fan 16 is reduced (S1305).

After controlling the variable means, it is determined again whether or not the discharge compressure (Pdc) of the compressor 10 is within the predetermined sucking/discharge compressure ranges (Ps1, Ps2/Pd1, Pd2). If the discharge compressure (Pdc) of the compressor 10 is within the predetermined sucking/discharge compressure ranges (Ps1, Ps2/Pd1, Pd2), namely in the range of 0.18-0.8 MPa for the sucking compressure and 1.26-3.4 MPa for the discharge compressure, the compressor 10 is allowed to operate in the current driving mode. If the discharge compressure (Pdc) of the compressor 10 is below the lowest limit (Pd1) of the predetermined discharge compressure range, however, the above-described procedure is repeated until the discharge compressure (Pdc) of the compressor 10 is within the predetermined discharge compressure range (Pd1, Pd2).

Figure 14:
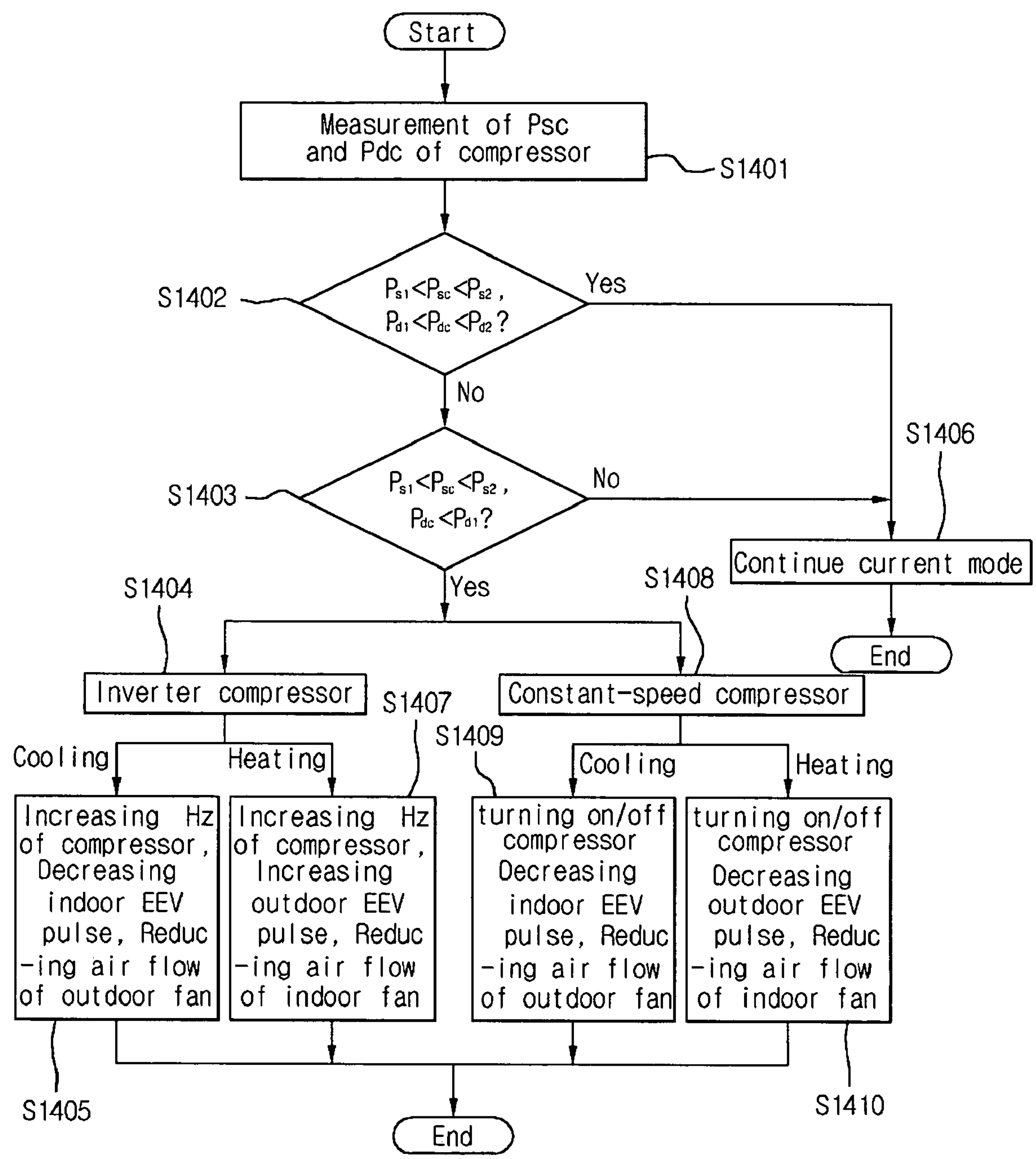
FIG. 14 illustrates the procedure of FIG. 13 being conducted at an inverter compressor and a constant-speed compressor.

FIG. 14 illustrates the procedure of FIG. 13 being conducted at an inverter compressor and a constant-speed compressor.

Since basic operations are same as described in FIG. 13, no further details will be provided here.

Only difference is that in case of the inverter compressor, the operational frequency in the cooling/heating mode is controlled and in case of the constant-speed compressor, the compressor is turned on/off.

Figure 15:
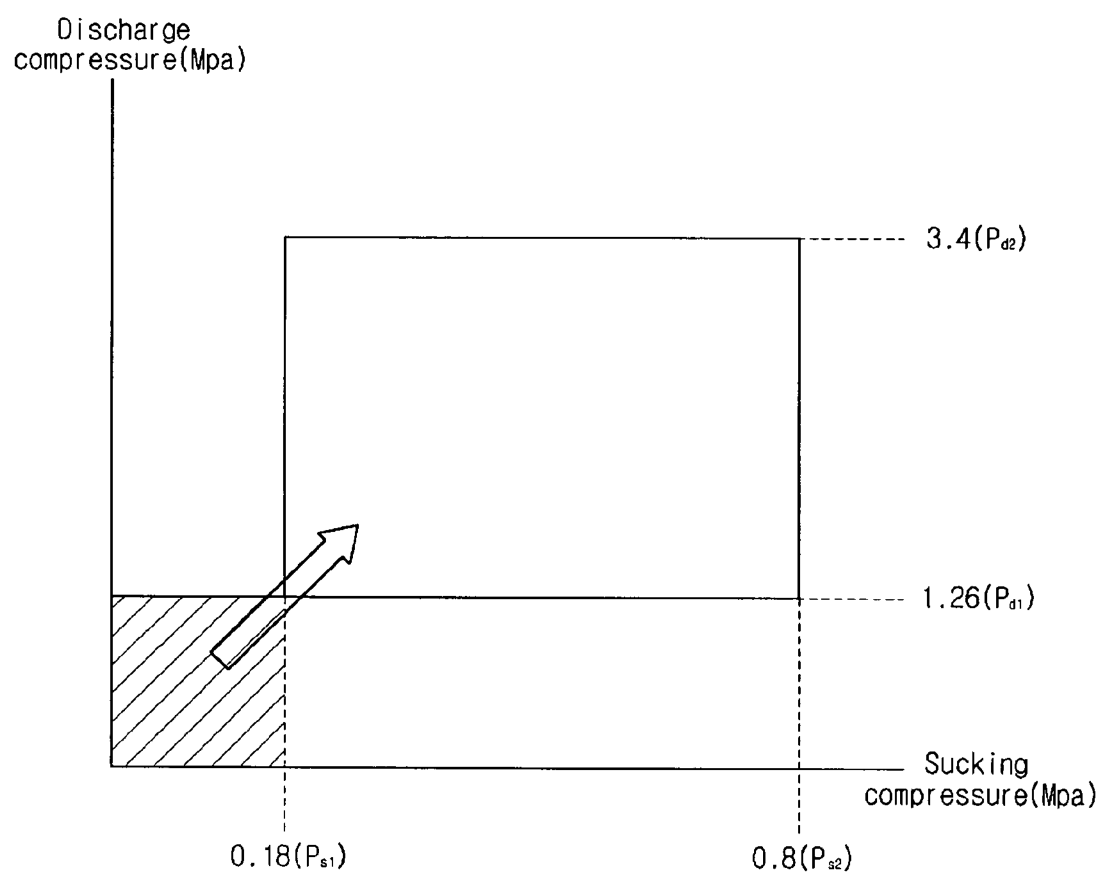
FIG. 15 graphically illustrates a driving mode of a compressor in an unstable area, in which sucking/discharge compressure of the compressor in operation are out of the lowest limit of predetermined sucking/discharge compressure.
Figure 16:
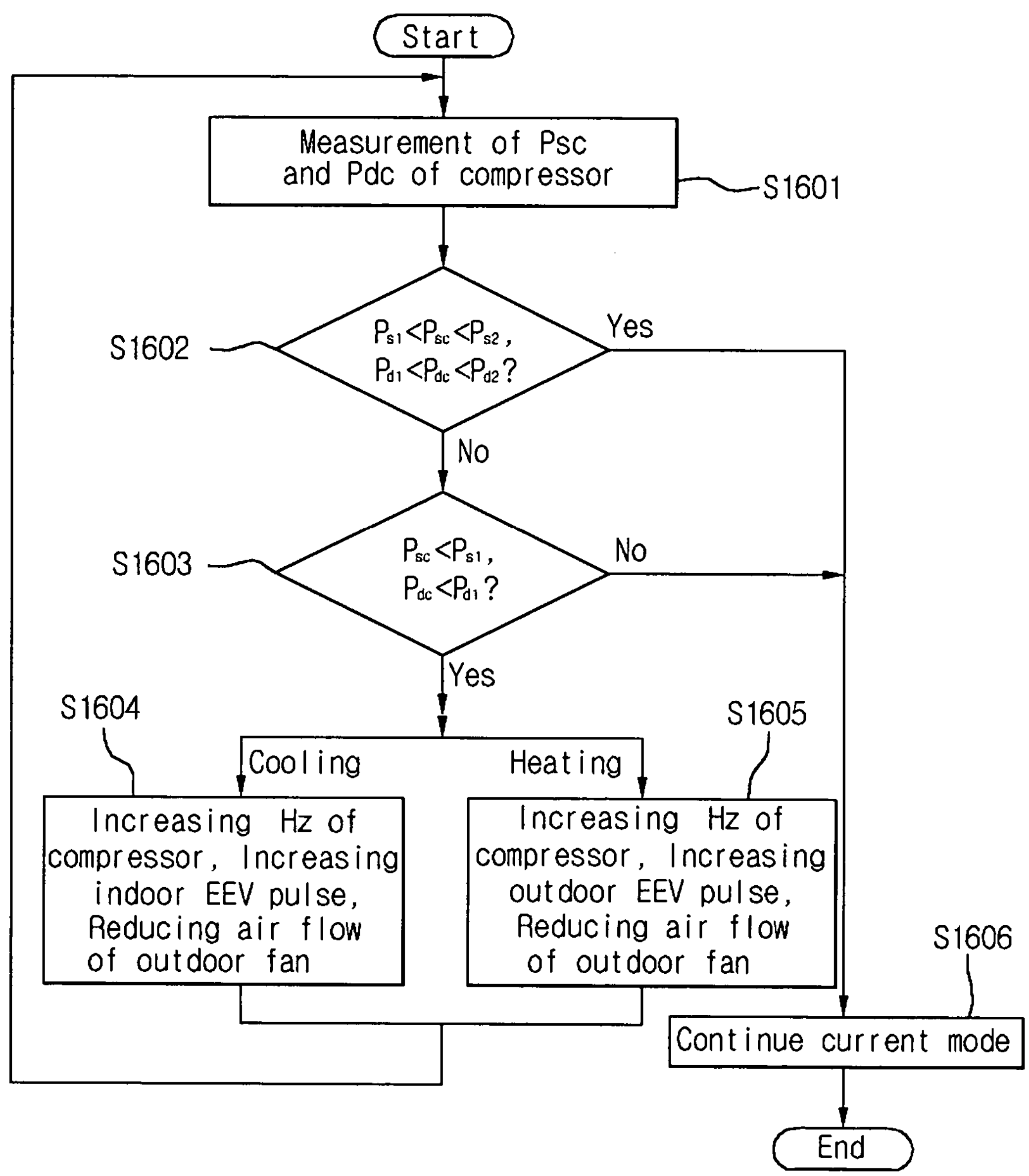
FIG. 16 is a flow chart describing a procedure for changing an unstable driving mode of a compressor being out of the lowest limit of predetermined sucking/discharge compressure to a safe driving mode within first, second predetermined sucking/discharge compressure ranges, in accordance with a third preferred embodiment of the present invention.

FIG. 15 graphically illustrates a driving mode of the compressor in the unstable area, in which the sucking/discharge compressure of the compressor in operation are out of the lowest limits of the predetermined sucking/discharge compressure; and FIG. 16 is a flow chart describing a procedure for changing the unstable driving mode of the compressor being out of the lowest limits of the predetermined sucking/discharge compressure to the safe driving mode within first, second predetermined discharge compressure ranges, in accordance with the third preferred embodiment of the present invention.

In the third embodiment of the invention, the unstable driving mode of the compressor 10 being out of the lowest limits (Ps1, Pd1) of the predetermined sucking/discharge compressure is changed to the safe driving mode within first, second predetermined sucking/discharge compressure ranges (Ps1, Ps2/Pd1, Pd2).

As described in FIG. 16, the sucking/discharge compressure (Psc, Pdc) of the compressor 10 in the cooling/heating mode are measured and compared to the predetermined sucking/discharge compressure of the compressor 10, in order to find out whether the sucking/discharge compressure measurements (Psc, Pdc) are within the first, second predetermined sucking/discharge compressure ranges (Ps1, Ps2/Pd1, Pd2).

If it turns out that the sucking/discharge compressure (Psc, Pdc) of the compressor are out of the lowest limits (Ps1, Pd1) of the predetermined sucking/discharge compressure, the variable means are controlled to ensure that the sucking/discharge compressure (Psc, Pdc) fall within the predetermined sucking/discharge compressure ranges (Ps1, Ps2/Pd1, Pd2).

After controlling the variable means, it is determined one more time whether or not the sucking/discharge compressure (Psc/Pdc) of the compressor 10 are within the predetermined sucking/discharge compressure ranges (Ps1, Ps2/Pd1, Pd2).

Controlling variable means of the air conditioner in the cooling/heating mode involves at least one of increasing the operational frequency (Hz) of the compressor 10 of the air conditioner in the cooling/heating mode, increasing indoor EEV pulse in the cooling mode, and increasing outdoor EEV pulse in the heating mode.

By controlling the variable means, the sucking/discharge compressure (Psc, Pdc) of the compressor 10 having been out of the lowest (first) limits (Ps1, Pd1) of the predetermined sucking/discharge compressure enters the same area within the first, second predetermined sucking/discharge compressure ranges (Ps1, Ps2/Pd1, Pd2). As a result, the reliability of the compressor 10 is secured.

The above-described method will now be elaborated with reference to the flow chart in FIG. 16.

As shown in FIG. 16, the sucking/discharge compressure (Psc/Pdc) of the compressor 10 of the air conditioner in the cooling/heating mode are measured (S1601).

The sucking/discharge compressure (Psc/Pdc) measurements of the compressor 10 are compared to the predetermined sucking/discharge compressure and it is determined whether the sucking/discharge compressure (Psc/Pdc) measurements fall in the range of the first and second predetermined sucking compressure (Ps1, Ps2), i.e. 0.18-0.8 MPa and of the first and second predetermined discharge compressure (Pd1, Pd2), i.e. 1.26-3.4 MPa, respectively (S1602).

If it turns out that the sucking/discharge compressure (Psc/Pdc) measurements are within the first and second sucking compressure ranges (Ps1, Ps2/Pd1, Pd2), namely 0.18-0.8 MPa/1.26-3.4 MPa, the compressor 10 is allowed to keep its current driving mode (S1606).

On the contrary, if the sucking compressure (Psc) of the compressor 10 is less than the lowest limit (Ps1) of the predetermined sucking compressure, i.e. 0.18 MPa and if the discharge compressure (Pdc) of the compressor 10 is less than the lowest limit (Pd1) of the predetermined discharge compressure, i.e. 1.26 MPa (S1603), it is necessary to make the sucking/discharge compressure (Psc/Pdc) of the compressor 10 fall in the predetermined compressure ranges. To do so, the operational frequency (Hz) of the compressor 10 (if it is in the cooling mode) is increased or the indoor EEV pulse is increased or air flow of the outdoor fan (13) (S1604).

If the compressor 10 is in the heating mode, the operational frequency (Hz) of the compressor 10 is increased or the outdoor EEV pulse is increased or air flow of the indoor fan 16 is reduced (S1605).

By increasing the sucking/discharge compressure (Psc/Pdc) of the compressor 10, one makes sure that they fall in the predetermined sucking/discharge compressure ranges (Ps1, Ps2/Pd1, Pd2)

After controlling the variable means, it is determined again whether or not the sucking/discharge compressure (Psc/Pdc) of the compressor 10 are within the predetermined sucking/discharge compressure ranges (Ps1, Ps2/Pd1, Pd2). If the sucking/discharge compressure (Psc/Pdc) of the compressor 10 are within the predetermined sucking/discharge compressure ranges (Ps1, Ps2/Pd1, Pd2), namely in the range of 0.18-0.8 MPa for the sucking compressure and 1.26-3.4 MPa for the discharge compressure, the compressor 10 is allowed to operate in the current driving mode. If the sucking/discharge compressure (Psc/Pdc) of the compressor 10 are still below the lowest limits (Ps1, Pd1) of the predetermined sucking/discharge compressure ranges, however, the above-described procedure is repeated until the sucking/discharge compressure (Psc/Pdc) of the compressor 10 are within the predetermined sucking/discharge compressure range (Ps1, Ps2/Pd1, Pd2).

Figure 17:
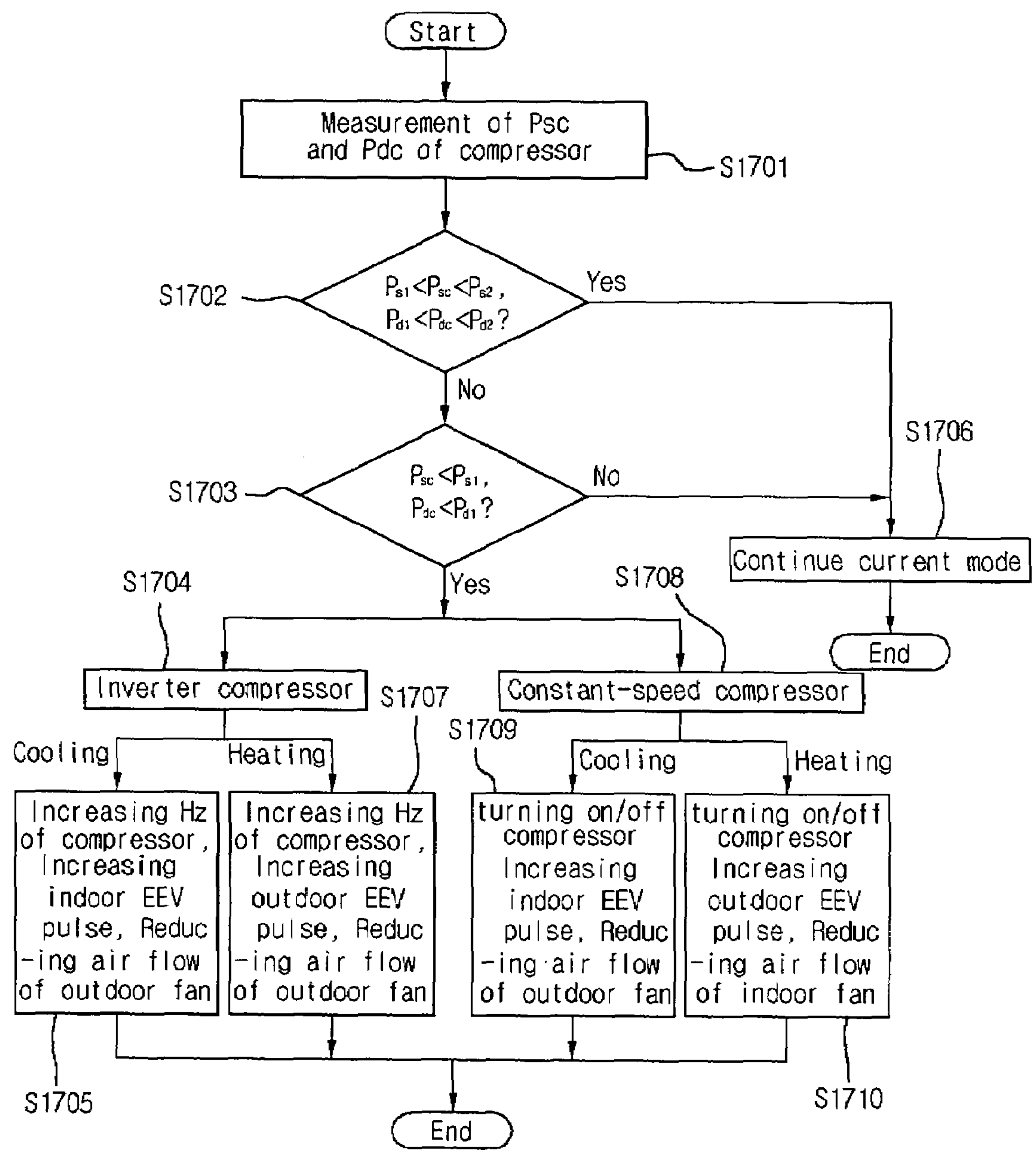
FIG. 17 illustrates the procedure of FIG. 16 being conducted at an inverter compressor and a constant-speed compressor.

FIG. 17 illustrates the procedure of FIG. 16 being conducted at an inverter compressor and a constant-speed compressor.

Since basic operations are same as described in FIG. 16, no further details will be provided here.

Figure 18:
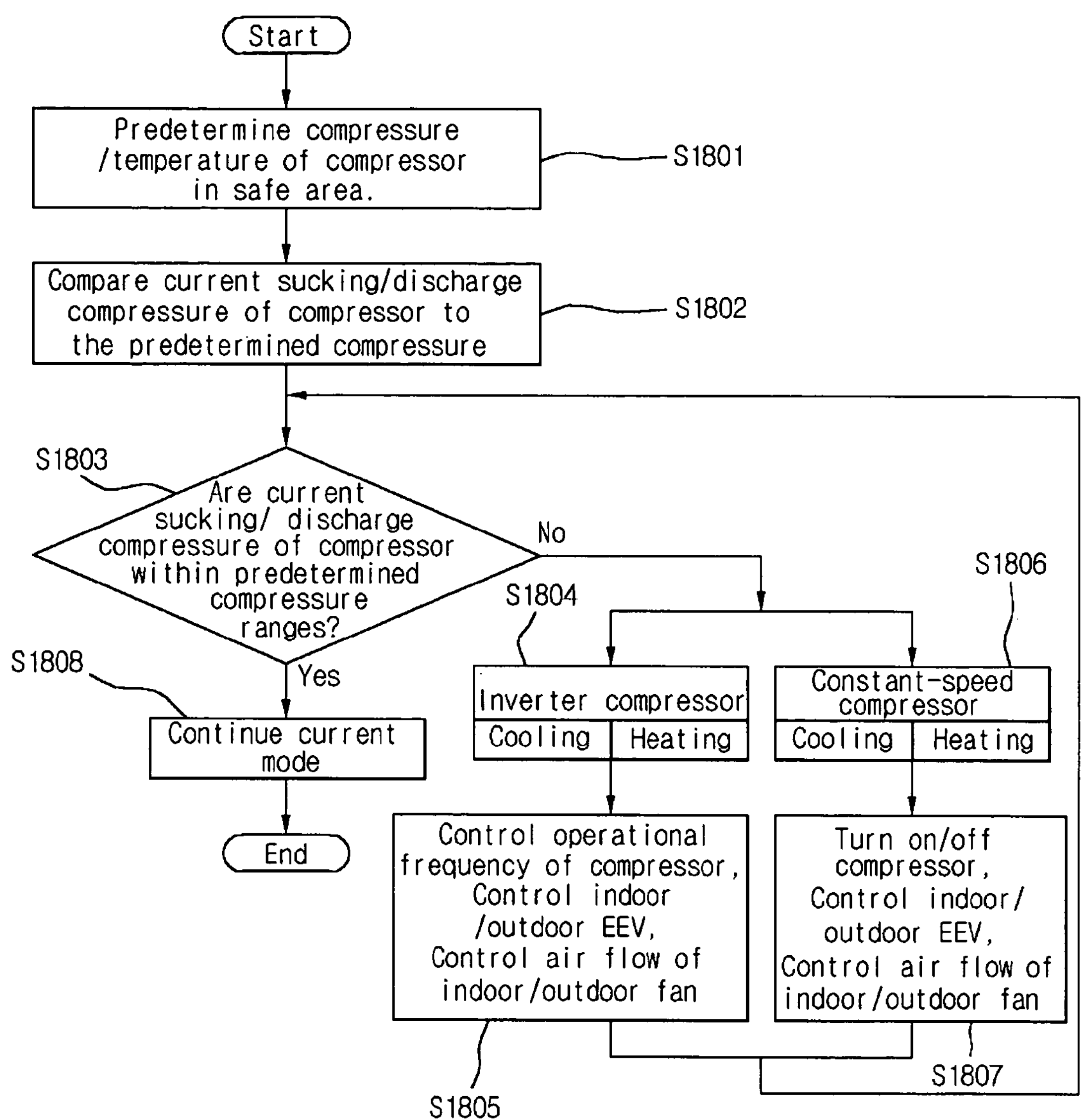
FIG. 18 describes a procedure for controlling variable elements to control driving mode of a compressor (i.e. cooling/heating) and to control the operations of inverter/constant-speed compressors, in accordance with the present invention.

Only difference is that in case of the inverter compressor, the operational frequency in the cooling/heating mode is controlled and in case of the constant-speed compressor, the compressor is turned on/off FIG. 18 describes a procedure for controlling variable elements to control driving mode of the compressor (i.e. cooling/heating) and to control the operations of inverter/constant-speed compressors, in accordance with the present invention.

As described in FIG. 18, a user predetermines compressure and temperature of the compressor in a proper driving mode (S1801).

The user compares the current sucking/discharge compressure of the compressor in operation to the predetermined compressure values (S1802).

If it turns out that the sucking/discharge compressure of the compressor in operation are out of the predetermined compressure ranges (S1803), given that the compressor in this case is the inverter compressor, at least one of operational frequency of the compressor in the cooling/heating mode, the indoor/outdoor EEV, and air flow of the indoor/outdoor fan is controlled (S1804, S1805).

Meanwhile, if the sucking/discharge compressure of the constant-speed compressor in operation are out of the predetermined compressure ranges (S1803), the compressor in the cooling/heating mode is turned on/off or the indoor/outdoor EEV is controlled or airflow of the indoor/outdoor fan is controlled (S1806, S1807).

In conclusion, according to the method for controlling the air conditioner of the present invention, the user determines whether the driving mode of the compressor 10 currently being run is in the safe area or in the unstable area and ensures that the compressor 10 is in the safe area by controlling variable means. In so doing, vibrations and noises generated in the unstable area are greatly reduced and thus, reliability and durability of the compressor 10 are improved. Another advantage of the present invention is that it is also applicable to a multi-split type air conditioner where a plurality of indoor units is connected to one single outdoor unit to cool/warm a plurality of indoor spaces at a time.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An air-conditioning system comprising:

a controller;

an indoor unit comprising:

an evaporator;

an indoor expansion valve; and an indoor fan; and an outdoor unit comprising:

a constant speed compressor;

a condenser;

an outdoor expansion valve; and an outdoor fan, wherein in response to receiving information about current discharge and sucking pressures of the constant speed compressor, the controller determines whether the current discharge and sucking pressures are within acceptable pressure ranges for the constant speed compressor, wherein in a cooling mode, in response to the controller determining that both the current sucking pressure and the discharge pressure are less than first predetermined thresholds, the indoor expansion valve's pulse is increased, the constant speed compressor is turned off, and the outdoor fan's generated air flow is decreased, wherein in a heating mode, in response to the controller determining that both the current sucking pressure and the discharge pressure are less than second predetermined thresholds, the outdoor expansion valve's pulse is increased, the constant speed compressor is turned on, the outdoor expansion valve's pulse is increased, and the indoor fan's generated air flow is decreased.

2. An air-conditioning system comprising:

a controller;

an indoor unit comprising:

an evaporator;

an indoor expansion valve; and an indoor fan; and an outdoor unit comprising:

a inverter compressor;

a condenser;

an outdoor expansion valve; and an outdoor fan, wherein in response to receiving information about current discharge and sucking pressures of the inverter compressor, the controller determines whether the current discharge and sucking pressures are within acceptable pressure ranges for the inverter compressor, wherein in a cooling mode, in response to the controller determining that the current discharge and sucking pressures are less than first predetermined thresholds, the inverter compressor's operational frequency is increased, the indoor expansion valve's pulse is increased, and the outdoor fan's generated air flow is decreased, wherein in a heating mode, in response to the controller determining that the current discharge and sucking pressures are less than second predetermined thresholds, the inverter compressor's operational frequency is increased, the outdoor expansion valve's pulse is increased, and the indoor fan's generated air flow is decreased.

* * * * *